Nov. 1, 1938.                J. F. FRESE                2,135,125
                   AIR COOLING SYSTEM FOR RAILWAY CARS
                          Filed Feb. 5, 1936
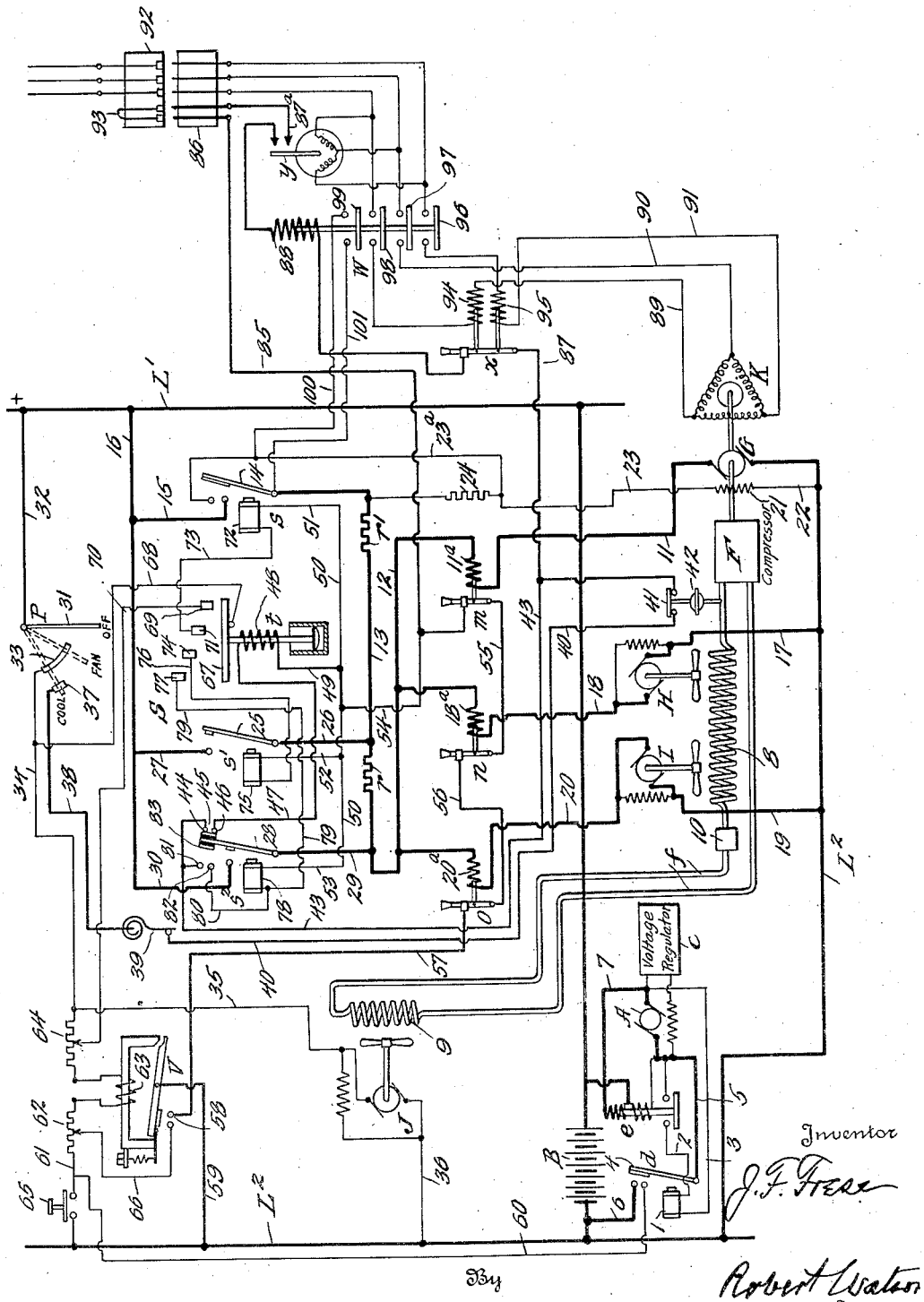
Inventor
J. F. Frese
By
Robert Watson
Attorney Patented Nov. 1, 1938

2,135,125

UNITED STATES PATENT OFFICE 2,135,125

AIR COOLING SYSTEM FOR RAILWAY CARS

Joseph F. Frese, Baltimore, Md., assignor to Monitor Controller Company, Baltimore, Md., a corporation of Maryland Application February 5, 1936, Serial No. 62,511

8 Claims. (Cl. 172—291)

This invention relates to an electrically operated refrigerating system for railway cars. The refrigerating mechanism comprises a compressor, a return pipe system connected to the compressor and including a condenser and a refrigerating coil. A direct current motor is provided for operating the compressor, a plurality of motors are provided for circulating cooling fluid around the condenser and a single starter is provided for starting and stopping all of said motors so that the compressor motor cannot be operated without the operation of the condenser motors. A control circuit is provided for controlling the starter, this circuit including a thermostat switch which opens and closes the circuit in accordance with the temperature in the car, and certain safety switches which open the circuit under abnormal conditions. The opening of any switch in the control circuit causes the starter to open the circuits of all of said motors. A fan motor for circulating air in the car past the cooling coil is operable independently of said control circuit and of the voltage of the battery.

The invention comprises also means for charging the battery and operating the refrigerating apparatus while the car is stationary by means of an alternating current motor which may be connected to a power line and which operates the compressor motor as a generator to charge the battery through the starter, and also operates the compressor.

Referring to the drawing, in which the invention is illustrated diagrammatically, A represents a generator adapted to be operated from the car axle and B indicates a battery which receives its charge from the generator. As the generator operates at variable speeds, a suitable voltage regulator c is provided for varying the resistance in the field circuit of the generator to limit the maximum voltage of the generator and maintain it constant at a suitable charging value. A contactor d is provided for connecting the armature circuit of the generator to the battery and the magnet coil 1 of this contactor is connected in a circuit 2—3 across the armature terminals of the generator, which circuit is controlled by a reverse current relay e. This relay closes the circuit 2—3 when the generator voltage is above the battery voltage and opens said circuit when the generator voltage falls below the battery voltage. When the circuit 2—3 is closed, the contactor arm 4 connects one brush of the generator to one side of the battery through conductors 5—6. The other brush of the generator is connected to the opposite side of the battery through conductor 7 and a coil of the reverse current relay. Supply wires L' and L², respectively, lead from the opposite poles of the battery and to these wires are connected the circuits of the various motors and motor controlling devices.

A refrigerator system is shown in outline comprising a compressor F which circulates fluid refrigerant through a pipe system f which includes a condensing coil 8, a refrigerating coil 9 and an expansion valve 10. A direct current motor G operates the compressor and two direct current motors H and I are shown for circulating cooling fluid, which may be liquid or air, around the condensing coil, and a direct current motor J is shown for circulating the air in the car around and past the cooling coil 9. An alternating current motor K is shown. This is driven idly by the compressor motor G and does no work except when the car is standing still, when it may be connected to an alternating current supply circuit and used to drive the compressor and also drive the motor G as a generator to charge the battery, as hereinafter explained.

The motors G, H and I are controlled by a common starter S. Thus the armature circuit of the compressor motor G extends from supply wire L² to the armature of the motor, thence by conductor 11 through coil 11ª of an overload switch m to conductor 12, thence through conductor 13, which is common to all of said motors, and resistance sections r, r' to arm 14 of contactor s, and when this contactor is closed, the armature circuit is completed to supply wire L' through conductors 15 and 16.

The armature circuit of motor H is from supply wire L² through conductors 17 and 18 and coil 18ª of overload switch n to conductor 12 and thence through the common conductor 13 and resistance sections to contactor arm 14, conductors 15 and 16, to supply wire L'.

The armature circuit of motor I is from supply wire L² through conductor 19 to the armature, thence through conductor 20 to coil 20ª of overload switch o, thence through conductor 12 to the common conductor 13, the resistance sections, contactor arm 14 and conductors 15 and 16 to the supply wire L'.

The field winding 21 of the compressor motor G is connected in a circuit which extends from supply wire L² through conductor 22 to the field winding, thence through conductor 23 to a resistance 24 which is connected to conductor 13 and contact arm 14 and when the contactor s closes, this resistance is shunted through conductor 23ª to strengthen the field while the compressor motor is starting. After the motor has been started, the contactor s opens and this reinserts the field resistance 24 in the field winding of the motor. The contactor s', which operates to cut out the section r' of the armature resistance, has its arm 25° connected to the conductor 13 by conductor 26 and when this contactor closes, the circuit from conductor 13 is completed to supply wire L' through conductors 27 and 16, thus cutting the resistance section r' out of the armature circuits of the motors G, H and I. The contact arm 28 of contactor $s^2$ is connected by conductor 29 to conductor 13 and when this contactor closes, the circuit is completed from conductor 13 through conductors 30 and 16 to the supply wire L', thus cutting out the resistance section r from the armature circuit of each motor. The contactors s, s' and $s^2$ are controlled so as to operate in sequence and in timed relation by a time-controlled relay t.

The air circulating motor J is controlled so that it may be operated independently of the compressor and condenser motors for circulating the air in the car even when the latter motors are stopped and it is very essential that the air circulating motor shall be in operation at all times while the compressor is in operation in order to avoid overheating in the system. Therefore, the electrical connections are such that the fan motor may be operated independently of the other motors and must be in operation while the other motors are operating.

An operator's switch P is provided for manually controlling the operation of the motors. As shown, a contact arm 31 is connected by conductor 32 to supply wire L' and this arm may be set in several different positions. In the position marked "off", all of the motors are stopped. In the position marked "fan", the contact arm 31 engages a single contact 33, which is connected by conductors 34 and 35 to the air circulating motor J and by conductor 36 to the supply wire $L^2$. Therefore, when the contact arm is in said position, the motor J will operate to circulate air past the cooling coil 9 into the car or room. If the contact arm 31 is moved into the position marked "cool", it will engage the contact 33 and also a contact 37 and through the latter contact a control circuit will be completed to cause the operation of the condenser and compressor motors, providing the temperature of the air in the car is high enough to cause the closure of a thermostat switch which is included in said circuit, and also providing certain safety switches are closed and the battery voltage is above a predetermined value. The air circulating motor J will operate whether the battery voltage is high or low and independently of the continuity of the control circuit for the other motors.

The control circuit for the starter S and motors G, H and I extends from supply wire L' through conductor 32 to contact arm 31 of switch P to contact 37, thence by conductor 38 through thermostat switch 39, thence by conductor 40 to a normally closed switch 41 which is adapted to be opened by a diaphragm 42 when the pressure in the pressure side of the compressor is abnormally high. From this high pressure switch, the control circuit continues through conductor 43 to contact 44 of a switch 45 which is normally closed by contact arm 28 of contactor $s^2$. The contact 46 of said switch is connected by conductor 47 to coil 48 of time-controlled relay t and from said coil the circuit extends by conductor 49 to conductor 50 which has branches 51, 52 and 53 leading to the magnet coils of contactors s, s' and $s^2$, respectively. The control circuit proceeds from conductor 50 through conductor 54 to overload switch m, thence by conductor 55 to overload switch n, thence by conductor 56 to overload switch o, thence by conductor 57 to contact 58 of low voltage relay V, and when this relay is closed the circuit is completed to the supply wire $L^2$ through conductor 59.

If the generator is stopped or operating below a suitable charging speed, the relay d will remain open, but if the generator voltage is above the battery voltage, the relay d will be closed and its contact member 4 will connect the generator and one side of the battery through conductor 60 to conductor 61 which leads through resistance 62 to coil 63 of the low voltage relay, and the circuit of said coil continues through resistance 64 and conductor 34 to the contact 33 of switch P and when the switch arm 31 is in engagement with said contact, the circuit is completed to the side L' of the supply circuit through conductor 32. As long as the generator voltage is above a predetermined value and the arm 31 of switch P is in engagement with the contact 33, the low voltage relay will remain closed and the control circuit before mentioned will be completed at said relay. If, however, the generator is stopped or is operating at a speed below the charging speed, the connection through the conductor 60 to the relay coil 63 will be open at the contactor d. In that event, when the operator desires to complete the control circuit and start the apparatus, after placing the switch arm 31 in the "cool" position, he depresses a reset button 65 which connects supply wire $L^2$ to conductor 61 and thereby completes the circuit through the coil of the low voltage relay momentarily. If the battery voltage is above a predetermined value, the relay will close and, in closing, will complete a holding circuit for its coil through conductor 66, and the relay will remain closed; but if the battery voltage is below that required for the safe operation of the motors, the relay will not close and the control circuit will not be completed and hence the motors cannot be operated.

Assuming the voltage to be high enough for safe operation of the motors G, H and I, with the operator's switch in the "cool" position and the low voltage relay closed, if the thermostat switch, high pressure switch and the overload switches m, n and o are closed, current will flow through the coil 48 of time-controlled relay t and its contact member 67 will be moved gradually upward. This member is connected to the operator's switch by conductors 68 and 34, and in the first part of the upward movement of said member, it engages a stationary contact 69 which is connected by conductor 70 to an intermediate point of the resistance 64 which is in series with the coil of the low voltage relay and connected through conductor 34 to the operator's switch. Engagement of the member 67 with the contact 69 therefore short circuits a part of said resistance which results in strengthening the current in the coil of the low voltage relay, so that said relay will not open when a heavy drain is placed upon the battery by the closure of the armature circuit of the compressor motor, as well as the circuits of the condenser motors, which takes place when the member 67 engages the next stationary contact 71. When this occurs, the coil of magnet 72 of contactor s is energized through a circuit which extends from the operator's switch through conductors 34, 68, 73, 51, 50 and 54 to overload switch $m$, thence through overload switches $n$ and $o$ and the low voltage relay to supply wire $L^2$. Contactor $s$ then closes, completing the circuits of the motors G, H and I through the starting resistance and also cutting the resistance 24 out of the field circuit of the compressor motor to strengthen its field for starting. The contact member 67 of the relay $t$ next engages stationary contact 74 and completes the circuit of the coil of magnet 75 of relay $s'$ through conductors 76 and 52 to conductor 50 and thence through the overload switches and the low voltage relay. Contactor $s'$ closes, cutting the resistance section $r'$ out of the armature circuits of the motors G, H and I. The contact member 67 next engages contact 77 and completes the circuit of the coil of magnet 78 of contactor $s^2$ through conductors 79, 53 and 50 and thence through the overload switches $m$, $n$ and $o$ and the low voltage relay. Contactor arm 28 then closes, cutting the resistance section $r$ out of the armature circuits of the motors and at the same time completing a holding circuit 80 for the coil of magnet 78 through stationary contacts 81 and 82 and an insulated contact 83 on the arm 28. In the closing movement of the arm 28, the circuit to the coil of the time-controlled relay $t$ is opened at the switch 45 and the contact member 67 drops downward interrupting the circuits through the coils of the magnets of contactors $s'$ and $s$ and these contactors open, leaving the armature circuit closed through the contactor $s^2$. In opening, the contactor $s$ breaks the short circuit around the field resistance 24 of the compressor motor so that the latter will operate at a higher speed. When contact member 67 of relay $t$ leaves the contact 69, it interrupts the shunt around part of the resistance 64 which is in series with the coil of the low voltage relay and the current in said coil is reduced to normal strength so that the relay will open if the voltage drops below a predetermined value safe for the operation of the motors.

If, while the system is in operation, the temperature of the room is reduced to a desirable low limit, the thermostat switch will open the control circuit, and this will cause the magnet 78, which is fed through its holding circuit 80, to become de-energized and the contactor arm 28 will open the circuits to the several motor armatures and its own holding circuit, and it will close the switch 45 to make up the circuit to the energizing coil of time-controlled relay $t$. When the temperature in the room rises sufficiently to cause the thermostat switch to close, the relay $t$ will operate automatically to cause the operation of the several motors G, H and I as before described.

If excessive pressure occurs in the pipe system in the compression side of the compressor while the latter is in operation, the high pressure switch 41 will open the control circuit, causing the magnet 78 to become de-energized and the contactor $s^2$ will open the motor circuits and cause stoppage of the motors G, H and I. The high pressure switch will close automatically and cause the motors to be restarted when the pressure goes down if the control circuit is complete at all other points.

In case of overload in the armature circuit of the compressor motor G, the coil $11^a$ will open the overload switch $m$ in the control circuit and this will cause the contactor $s^2$ to open the circuits of the compressor and condenser motors and cause stoppage of the same. Similarly, an overload current in the armature circuit of the motor H will cause coil $18^a$ to open the overload switch $n$ in the control circuit and cause stoppage of the compressor and condenser motors, and an overload current in the armature circuit of motor I will cause coil $20^a$ to open the overload switch $o$ and cause stoppage of said motors. As an overload on a motor calls for an investigation of the cause, the overload switches are made so that they will stay open until closed by hand.

When the car is standing idly in a yard or station and the battery cannot be charged by the generator A, the alternating current motor K may be connected to a power line and used to drive the compressor motor as a generator and also to drive the compressor. For this purpose a branch circuit is extended from the control circuit for operating a contactor W to connect the alternating current motor to the supply circuit. This branch of the control circuit comprises a conductor 85 extending from conductor 54 of the control circuit to a plug 86, and a conductor 87 extending from the conductor 43 of the control circuit through the coil 88 of the contactor W to a switch $y$ and from said switch conductor $87^a$ extends to the plug. The motor is shown as a three-phase motor whose circuits 89, 90 and 91 extend from the motor through the normally open switches of the contactor to the plug 86. The terminals of the several conductors attached to the plug are shown projecting from one end thereof and these terminals are adapted to enter recesses in a socket 92 to which the wires of a power line are attached. The terminals of the wires 85 and $87^a$, when in the socket, are connected together by a loop 93 which completes the circuit through the contactor coil when the plug is in the socket and the switch $y$ is closed. This switch will be closed if the phases in the motor circuit are in the proper relation to operate the motor in the desired direction, but will remain open if they are not in such relation, so that it will be possible to operate the contactor only when the phases are in the right relation. An overload switch $x$ is arranged in the conductor 87 of the control circuit and coils 94 and 95 in the different legs of the motor circuit are adapted to open this switch in case the motor K is overloaded.

The contactor W has contact members 96, 97 and 98 for closing the motor circuits and a contact member 99 for connecting a conductor 100 to a conductor 101. Conductor 101 is connected through conductors 13 and 23 and field resistance 24 to the field winding of the compressor motor, and conductor 100 is connected through conductors $23^a$ and 23 to the field winding. Hence when the contactor closes the circuit between conductors 100 and 101, the resistance will be short circuited which will increase the field strength of the motor, as is desirable when the motor is being driven as a generator.

To start the alternating current motor, the plug 86 is inserted in the socket 92 and the operator's switch lever is placed in the "cool" position and the push button 65 is then manually depressed to energize the coil of the low voltage relay. This relay closes and completes the control circuit and also its own holding circuit. Current from the battery will then flow through the branch circuit 85—87 and the coil of contactor W will be energized. The contactor will close the circuits of the motor K and will cut the resistance 24 out of the field circuit of the compressor motor G. The motor K will then drive the motor G as a generator and also operate the compressor. The time-controlled relay t will be energized and will operate as before described to close the contactors s, s' and s² in succession and when the last mentioned contactor closes, it will place the armature circuit of the motor G across the battery terminals and also open the circuit of the relay t which will then return to its normal position, opening the circuit of contactors s' and s. It will be noted that opening the control circuit at the switch 45 of contactor s² does not affect the flow of current through the branch circuit 85—87 to the coil of contactor W, as conductor 85 is connected to supply wire L² through conductors 55, 56, 57, the overload switches m, n, and o, and the low voltage relay, and conductor 87 is connected to supply wire L' through the high pressure switch 41, conductor 40, thermostat 39 and the operator's switch and conductor 32. Therefore, after the closure of the contactor s², the alternating current motor will continue to drive the motor G as a generator which will charge the battery through the circuit which includes the contact member of contactor s². The compressor will also be driven mechanically by the alternating current motor to which it is connected, and the condenser motors will operate as they are connected across the terminals of the motor G and also across the battery terminals. The air circulating motor J will operate because it is connected across the battery terminals through the operator's switch. It will be seen that all of the switches in the control circuit are in series with the energizing coil 88 of the contactor W, and should any of these switches open, the coil 88 will be de-energized, and contactor W will operate to stop the alternating current motor. The holding circuit of magnet 78 of main contactor s² of the starter S is in the control circuit, and when current in that circuit fails, contactor arm 28 opens and breaks the connection between the armatures of the motors G, H and I and the supply wire L' leading to the battery.

To stop the alternating current motor, the contact arm of the operator's switch may be moved off of the contact 37 to interrupt the control circuit, which will cause the coil of contactor W to become de-energized and the contactor will open the circuits of said motor. The plug may then be pulled out of the socket 92. While the alternating current motor is in operation, interruption of the control circuit by the thermostat switch, the high pressure switch or any of the overload switches m, n, o or x will interrupt the flow of direct current to the coil of contactor W, and this contactor will open the motor circuits, causing stoppage of the motor.

What I claim is:

1. In a refrigerating system, a storage battery, a supply circuit connected thereto, a motor, a series of contactors for connecting the motor to the supply circuit and cutting resistance out of the armature circuit, to start the motor, a retarded relay controlling said contactors for operation in sequence, a control circuit including the coil of said relay, a low voltage relay having an energizing coil, manually controlled means for connecting said energizing coil to the supply circuit, said low voltage relay adapted to close the control circuit when the voltage in the supply circuit is above a predetermined value and to open the control circuit when the voltage in the supply circuit falls below said value, and means for strengthening the magnetic field of said low voltage relay while the motor is starting and for weakening said field after the motor has been started.

2. In a refrigerating system, a storage battery, a supply circuit connected thereto, a motor, a series of contactors for connecting the motor to the supply circuit and cutting resistance out of the armature circuit, to start the motor, a retarded relay controlling said contactors for operation in sequence, a control circuit including the coil of said relay, a low voltage relay having an energizing coil, manually controlled means for connecting said energizing coil to the supply circuit, said low voltage relay adapted to close the control circuit when the voltage in the supply circuit is above a predetermined value and to open the control circuit when the voltage in the supply circuit falls below said value, and means controlled by said retarded relay for strengthening the magnetic field of said low voltage relay in advance of the closure of the first of said contactors and for weakening said magnetic field after the last of said contactors has closed.

3. In a refrigerating system, a storage battery, a supply circuit connected thereto, a motor, a series of contactors for connecting the motor to the supply circuit and cutting resistance out of the armature circuit, to start the motor, a retarded relay controlling said contactors for operation in sequence, a control circuit including the coil of said relay, a low voltage relay having an energizing coil, manually controlled means for connecting said energizing coil to the supply circuit, said low voltage relay adapted to close the control circuit when the voltage in the supply circuit is above a predetermined value and to open the control circuit when the voltage in the supply circuit falls below said value, a resistance normally in circuit with said energizing coil, and means controlled by said retarded relay for reducing the resistance in circuit with the energizing coil in advance of the closure of the first of said contactors, and for restoring the resistance in said circuit to normal after the last of said contactors has closed.

4. In a refrigerating system, a first motor, a second plurality of motors, a starter common to all of said motors, said starter comprising a resistance in series with the armature of each of said motors, a contactor for closing the armature circuits and contactors for cutting out said resistance, a retarded relay controlling said contactors for operation in sequence, a control circuit including the coil of said relay, one of said contactors adapted, in closing, to open the circuit to said coil and connect a holding circuit for its own coil to said control circuit, overload switches connected in series in said control circuit, one switch for each motor, and a coil in the armature circuit of each motor for opening one of said switches in case the motor is overloaded, whereby an overload current in any of the armature circuits will cause the opening of the control circuit and stoppage of all of said motors.

5. In a refrigerating system, a first motor, a second plurality of motors, a starter common to all of said motors, said starter comprising a resistance in series with the armature of each of said motors, a contactor for closing the armature circuits and contactors for cutting out said resistance, a retarded relay controlling said contactors for operation in sequence, a control circuit including the coil of said relay, one of said contactors adapted, in closing, to open the circuit to said coil and connect a holding circuit for its own coil to said control circuit, overload switches connected in series in said control circuit, one switch for each motor, and a thermostat switch, a high pressure switch and a low voltage relay switch in series in said circuit, whereby the opening of any of said switches will cause the stoppage of all of said motors.

6. In a refrigerating system, a storage battery, a variable speed generator for charging the battery, a motor, a starter for connecting the motor to the battery circuit, a control circuit for controlling the operation of the starter, a low-voltage relay having an energizing coil, a circuit for connecting said coil to the battery circuit including a normally open switch, said relay, when its coil is energized, adapted to close the control circuit if the battery voltage is above a predetermined value and to open said control circuit if the battery voltage falls below said value, and means for automatically reclosing said relay, after it has opened by failure of battery voltage, if the generator voltage rises above the battery voltage.

7. In a refrigerating system, a storage battery, a variable speed generator for charging the battery, a motor, a starter for connecting the motor to the battery circuit, a control circuit for controlling the operation of the starter, a low-voltage relay having an energizing coil, a circuit for connecting said coil to the battery circuit including a normally open switch, said relay, when its coil is energized, adapted to close the control circuit if the battery voltage is above a predetermined value and to open said control circuit if the battery voltage falls below said value, means for automatically reclosing said relay, after it has opened by failure of battery voltage, if the generator voltage rises above the battery voltage, comprising a contactor having a coil responsive to generator voltage, means for connecting said coil to the generator when the voltage of the latter rises above the battery voltage, and a circuit controlled by said contactor for connecting the energizing coil of the relay to the generator.

8. In a refrigerator system, a storage battery, a variable speed generator for charging the battery, a driven member, a first direct current motor for operating the driven member, a second direct current motor, a starter common to both of said motors, said starter comprising a resistance in series with the armature of each of said motors, a contactor for closing the armature circuits and contactors for cutting out said resistance, a retarded relay controlling said contactors for operation in sequence, a control circuit including the coil of said relay, one of said contactors adapted, in closing, to open the circuit to said coil and connect a holding circuit for its own coil to said control circuit, overload switches connected in series in said control circuit, one switch for each motor, and a thermostat switch, a high pressure switch and a low voltage relay switch in series in said circuit, an alternating current motor adapted for operating said driven member and for operating said first motor as a generator, a manually operable switch for connecting the circuits of said alternating current motor to a supply circuit, and a normally open relay for closing the circuits of the alternating current motor, said relay having an operating coil included in the aforesaid control circuit.

JOSEPH F. FRESE.